Patented May 29, 1923.

1,457,235

UNITED STATES PATENT OFFICE.

RICHARD STÜSSER, OF DENTZ, GERMANY, ASSIGNOR TO FARBENFABRIKEN VORM. FRIEDR. BAYER AND CO., OF LEVERKUSEN, NEAR COLOGNE-ON-THE-RHINE, GERMANY.

AZO DYESTUFFS.

No Drawing.     Application filed December 23, 1921.   Serial No. 524,483.

*To all whom it may concern:*

Be it known that I, RICHARD STÜSSER, a citizen of Germany, residing at Dentz, Germany, have invented new and useful Improvements in Azo Dyestuffs, of which the following is a specification.

According to the present invention new and valuable cotton azodyestuffs are obtained by combining one molecular proportion of the tetrazocompound of the 4.4'-diaminodiphenyl-3.3'-dicarboxylic acid having most probably the formula:

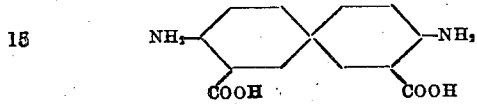

with one molecular proportion of each of two different azodyestuff components of which one contains sulfonic or carboxylic groups.

My new dyestuffs are after being dried and pulverized in the shape of their alkaline salts dark powders soluble in water and in concentrated sulfuric acid generally with from a yellow to blue coloration. They yield by reduction with stannous chlorid and hydrochloric acid 4.4'-diaminodiphenyl-3.3'-dicarboxylic acid, an aromatic amin and an aromatic amin containing an acid group, e. g., a sulfonic or a carboxylic group or both. They dye cotton from yellow to orange to violet to blue shades which when aftertreated with copper salts generally change into deeper shades, e. g., from violet to blue, from red to blue-red, from orange to yellowish-brown, etc. The aftertreated shades are distinguished for an excellent fastness to light and to washing.

In order to illustrate my invention more fully the following example is given, the parts being by weight:

544 parts of 4.4'-diaminodiphenyl-3.3'-dicarboxylic acid are tetrazotized in glacial acetic acid with 276 parts of sodium nitrite and 750 parts of hydrochloric acid 19½° Bé. To the resulting tetrazo solution 438 parts of phenyl-beta-naphthylamin dissolved in glacial acetic acid is added. After the formation of the intermediate product is complete it is filtered off and stirred into a solution of 461 parts of 5.5'-dioxy-2.2'-dinaphthylamin-7.7'-disulfonic acid. The tetrazo dye is salted out, filtered off and dried.

It is after being dried and pulverized in the shape of its sodium salt a dark powder soluble in water with a violet, in concentrated sulfuric acid with a blue coloration. It yields upon reduction with stannous chlorid and hydrochloric acid 4.4'-diaminodiphenyl-3.3'-dicarboxylic acid, aminophenyl-naphthylamin and 6.6' diamino-5.5'-dioxy-2.2'-dinaphthylamin-7.7'-disulfonic acid. It dyes cotton violet shades which when aftertreated with copper sulfate change into blue shades fast to light and to washing.

In the following table the shades of some of my new dystuffs are given:—

*Dyestuff obtained from 4.4'-diaminodiphenyl-3.3'-dicarboxylic acid combined with:*

|  | Dyes cotton— | After treated with copper sulfate— |
|---|---|---|
| Methylphenylpyrazolon and 1-para-sulfophenyl-3-methyl-5-pyrazolon. | Orange... | Brownish-orange. |
| Methyl-2-naphthylamin and 1-para-carboxyphenyl-3-methyl-5-pyrazolon. | Bordeaux | Brownish-bordeaux. |
| Phenyl-2-naphthylamin and methyl-2-naphthylamin-7-sulfonic acid. | Reddish-violet. | Violet-blue |
| Aceto-acetic-ortho-chloro-anilid and 1-amino-8-oxynaphthalene-4-sulfonic acid. | Red-brown. | Green. |
| Phenyl-2-naphthylamin and 1.8-aminonaphthol-4-sulfonic acid. | Violet.... | Blue. |
| Phenyl-2-naphthylamin and 1-oxynaphthalene-5-sulfonic acid. | Violet.... | Blue-violet |
| Aceto-acetic-ortho-chloro-anilid and 1-phenyl-5-pyrazolon-3-carboxylic acid. | Orange... | Yellowish-brown. |
| Aceto-acetic-anilid and aceto-acetic-anilid-para-carboxylic acid. | Reddish-yellow. | Brownish-yellow. |

I claim:—

1. The herein described new azodyestuffs, which are after being dried and pulverized in the shape of their alkaline salts dark powders soluble in water and in concentrated sulfuric acid generally with from a yellow to blue coloration; yielding by reduction with stannous chlorid and hydrochloric acid 4.4'-diaminodiphenyl-3.3'-dicarboxylic acid, and two aromatic amines, one and only one of which contains an acid group; dyeing cotton from yellow to orange to violet to blue shades which by an aftertreatment with copper salts generally change into deeper shades fast to light and to washing, substantially as described.

2. The herein described new azodyestuffs, which are after being dried and pulverized in the shape of their alkaline salts dark powders soluble in water and in concentrated sulfuric acid generally with from a yellow to blue coloration; yielding by reduction with stannous chlorid and hydrochloric acid 4.4'-diaminodiphenyl-3.3'-dicarboxylic acid, and two aromatic amines, one and only one of which contains a sulfonic group; dyeing cotton from yellow to orange to violet to blue shades which by an aftertreatment with copper salts generally change into deeper shades fast to light and to washing, substantially as described.

3. The herein described new azodyestuff, which is after being dried and pulverized in the shape of its sodium salt a dark powder soluble in water with a violet and in concentrated sulfuric acid with a blue coloration; yielding upon reduction with stannous chlorid and hydrochloric acid 4.4'-diaminodiphenyl-3.3'-dicarboxylic acid, an aminophenyl-naphthylamin and 6.6'-diamino-5.5'-dioxy-2.2'-dinaphthylamin-7.7'-disulfonic acid; dyeing cotton violet shades which by an aftertreatment with copper sulfate change into blue shades fast to light and to washing, substantially as described.

4. As new products azodyestuffs such as may be prepared by the hereindescribed process, which comprises combining one molecular proportion of the tetrazo compound of 4.4'-diaminodiphenyl-3.3' dicarboxylic acid with one molecular proportion each of two different azodyestuffs components, one and only one of which contains an acid group.

In testimony whereof I have hereunto set my hand in the presence of two subscribing witnesses.

RICHARD STÜSSER. [L. S.]

Witnesses:
HANS BRÜKNER,
HERMANN HÖLZER.